United States Patent [19]

Spitz et al.

[11] Patent Number: 5,438,628
[45] Date of Patent: Aug. 1, 1995

[54] METHOD FOR MATCHING TEXT IMAGES AND DOCUMENTS USING CHARACTER SHAPE CODES

[75] Inventors: A. Lawrence Spitz, Palo Alto, Calif.; Antonio P. Dias, Cambridge, Mass.

[73] Assignees: Xerox Corporation, Stamford, Conn.; Fuji Xerox Corporation, Tokyo, Japan

[21] Appl. No.: 220,926

[22] Filed: Mar. 31, 1994

Related U.S. Application Data

[63] Continuation-in-part of Ser. No. 47,540, Apr. 19, 1993.

[51] Int. Cl.$^6$ ............................................. G06K 9/00
[52] U.S. Cl. ................................... 382/181; 382/229; 364/419.13
[58] Field of Search .................... 382/10, 11, 34, 36, 382/37, 40, 21.26; 364/419.13, 419.19, 943.43, 943.44

[56] References Cited

U.S. PATENT DOCUMENTS 5,119,327  6/1992  Skinner ............................... 395/800

OTHER PUBLICATIONS

Francine R. Chen et al.; "Detecting and Locating Partially Specified Keywords in Scanned Images using Hidden Markov Models;" 1993 IEEE; pp. 133–138.

Primary Examiner—Michael T. Razavi
Assistant Examiner—Baeil P. Park
Attorney, Agent, or Firm—Oliff & Berridge

[57] ABSTRACT

A first method for exact and inexact matching of documents stored in a document database includes the step of converting the documents in the database to a compacted tokenized form. A search string or search document is then converted to the compact tokenized form and compared to determine if the test string occurs in the documents of the database or whether the documents in the database correspond to the test document. A second method for inexact matching of a test document to the documents in the database includes generating sets of one or more floating point values for each document in the database and for the test document. The sets of floating point numbers for the database are then compared to the set for the test document to determine a degree of matching. A threshold value is established and each document in the database which generates a matching value closer to the test document that the threshold is considered to be an inexact match of the test document.

6 Claims, 9 Drawing Sheets

| Character Shape Code | Members |
|---|---|
| A | ABCDEFGHIJKLMNOPQRSTUVWXYZbdfhklβ1234567890#$&()/[]@{}! |
| x | acemnopsuvwxz |
| i | íàáâãèéêëìíîïòóôõùúûü |
| g | gpqyŝ |
| j | j |
| ʹ | ʹ |
| - | - |
| · | · |
| ·· | ·· |
| = | = |
| U | äëïöüÄËÏÖÜ |
| ! | ! |

FIG.3 xxixxA. AxxAAxxxx ix AAx ixAxxxxAixxxA
xxxxAxxg xgxAxx xxx xAxAg xxxxgA Ax-
Axxx AxxA xxxA'x xxAixx. Aixxx AAAA, AAx
xxxxAg AxxAxAA ixxxxxxx ix xiA gxixxx Axx

FIG.6

METHOD FOR MATCHING TEXT IMAGES AND DOCUMENTS USING CHARACTER SHAPE CODES

BACKGROUND OF THE INVENTION

This is a Continuation-in-Part of U.S. patent application Ser. No. 08/047,540, filed on Apr. 19, 1993.

FIELD OF THE INVENTION

This invention relates to a method for comparing a text image to a document and for locating a document in a database of documents based on comparing character shape code representations of the text image and the document. Specifically, this invention relates to converting the text image and document into a character shape code representation using a limited number of character codes to represent the gross physical shapes of the characters of the text image and document.

RELATED ART

In the conventional systems well known in the art, before a text image can be compared to a text document, the text image must first be converted to a separate text document using optical character recognition (OCR) techniques. However, optical character recognition processes usually generate a recognized text document having a large number of errors, such as substitutions, deletions and insertions. Thus, it is usually impossible to get an exact match between the optically recognized text document and an electronic text document. Accordingly, it is often difficult, if not impossible, to correctly match the recognized text document with the correct database text document.

SUMMARY OF THE INVENTION

This invention provides a method for converting a text image comprising character shape coded word tokens into a compacted character shape code representation.

This invention also provides a method for exact matching of text images and text documents in the compacted character shape code.

This invention further provides for a method for inexact matching of a tokenized text image to a text document by generating a plurality of floating point numbers generated from each of the tokenized text image and the tokenized text document. These floating point numbers are then compared to inexactly match the text images to text documents.

To perform these and other objective of this invention, in a first preferred embodiment, a text image is first scanned and then converted into a tokenized text image using the method for automatic character shape classification set forth in copending U.S. patent application Ser. No. 08/047,540 to Spitz, which is incorporated herein by reference.

Previously, a library of electronically stored (i.e., stored as character coded text) text documents was also converted into a library of tokenized electronic text documents using this method. The tokenized documents were then converted to compacted tokenized electronic text documents using the first preferred embodiment of the compacting method of this invention. Similarly, after the text image is converted to a tokenized text image, it is converted to a compacted tokenized text image using the first preferred embodiment of the compacting method of this invention. The compacted tokenized text image is then compared to the library of documents stored in a database to determine an exact match.

In a second preferred embodiment, the database comprises a library of compacted tokenized text images rather than compacted tokenized electronic text documents. An electronic text string is converted into compacted tokenized form and used to search the database library of text images to locate text images containing an exact match of the text string.

In a third preferred embodiment, a text image and an electronic text document are each represented by a set of one or more floating point numbers. The set of floating point numbers of a test document, either the text image or the electronic text document, is compared with a, database of sets of floating point numbers for a plurality of the other of the text images or the electronic text documents. The sets of floating point numbers of the database documents are compared to the set for the test document to inexactly identify the text images or the documents matching the test document.

These and other features and advantages of the invention are described in or apparent from the following detailed description of the preferred embodiments.

BRIEF DESCRIPTION OF THE DRAWINGS

The invention is described in relation to the accompanying drawings, in which:

FIG. 3 shows the character shape code symbols and the actual corresponding script characters;

FIG. 6 shows the text portion of FIG. 2 converted by the character shape code classification scheme of FIG. 3;

DETAILED DESCRIPTION OF THE PREFERRED EMBODIMENTS

Before text images and electronic text documents can be compacted using the methods set forth below, the text documents and text images must first be converted from character coding, in the case of electronic text documents, or a bitmap, in the case of text images, into a tokenized character shape code representation.

Figure 1:
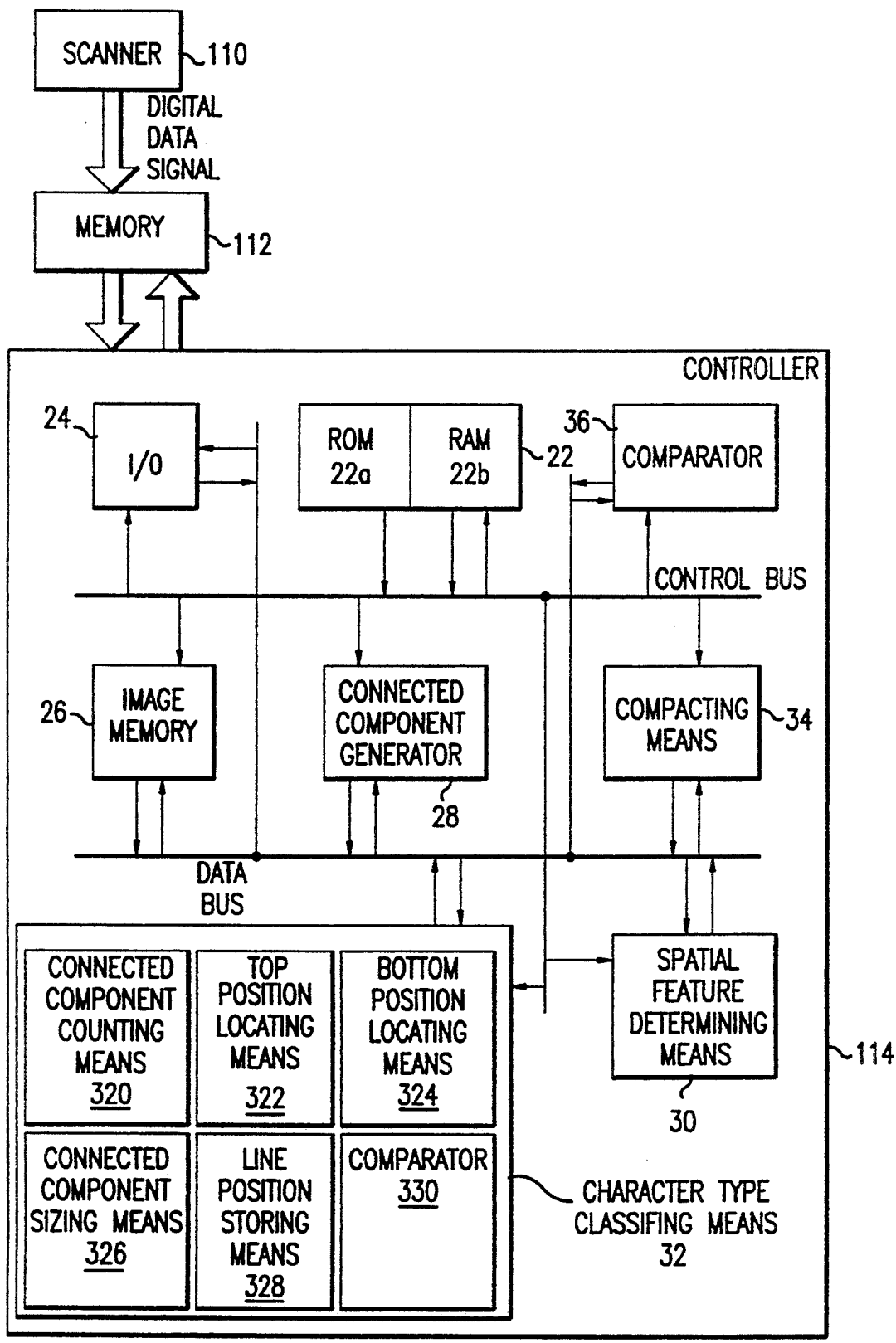
FIG. 1 shows a block diagram of a character shape code recognition system.

As shown in FIG. 1, a character shape code recognition system comprises a scanner 110 having a charge-coupled device (CCD) or the like. The scanner 110 scans a document, such as the one shown in FIG. 2, 100 having an image 102, the image 102 comprising a European script-type text string, and outputs a digital data signal representative of the location and image density of a plurality of pixels comprising the image 102 of the original document 100.

This digital data signal is sent to a memory 112, where it is stored temporarily or indefinitely. The digital data signal, when output from the memory 112, is input to a general purpose digital computer 114. Once input to computer 114, the digital data signal is first cleaned up by removing any non-text portions of the image 102, leaving a text portion 104. Further, any scanner artifacts of the digital data signal, such as skew or the like, are corrected for. The cleaned-up digital data signal is then restored to the memory 112 or stored in a memory of the computer 114. Alternatively, the scanner 110 can provide some of the preprocessing, such as removal of scanner artifacts.

As shown in FIG. 1, the general purpose digital computer 114 of this invention comprises a memory 22 for storing a control program, an input/output circuit 24 for inputting the digital data signal from the memory 112 and for outputting a signal representative of the determined word tokens of the text portion 104 of the image 102 or of the matching document(s). The general purpose computer 114 also comprises an image memory 26 for storing the digital data signal, a connected component generating means 28 for generating connected components from the digital data signal; a spatial feature determining means 30 for determining the coordinates of lines, words and character cells of the text portion 104 and the location of each connected component within each character cell; a character shape classifying means 32 for converting the character cell to an abstracted character shape code; and a compacting means 34 for converting the text portion 104, based on the determined word tokens, into compacted tokenized form. The memory 22 storing the control program may comprise either a ROM 22a or a RAM 22b.

In a preferred embodiment of the classifying means 32, the classifying means 32 includes a connected component counting means 320 for determining the number of connected components within the current character cell, a top position locating means 322 for locating the top position of at least one connected component within the current character cell, a bottom position locating means 324 for locating the bottom position of at least one connected component of the current character cell; a connected component sizing means 326 for determining the height and width of at least one connected component of the current character cell; a line position storing means 328 for storing at least one of the baseline and x-line positions of the line containing the current character cell and a comparing means 330 for comparing at least one of a connected component top position, a connected component bottom position, and a connected component height with at least one of a baseline position, a x-line position and a connected component width.

In an alternative embodiment associated with the first preferred embodiment of the compacting method, the classifying means also includes a gap determining means 332 for determining if a gap exists in a right-side portion of the connected component. Of course, it is understood that each function and corresponding means of the connected component generating means 28, the spatial feature determining means 30, the classifying means 32 and the compacting means 34 can be implemented by independent means, and such structure would be equivalent to the preferred embodiments of the present invention as set forth above. A comparator 36 compares the compacted text strings or documents to the database. The comparator 36 also compares the sets of floating point values of the third preferred embodiment.

Figure 2:
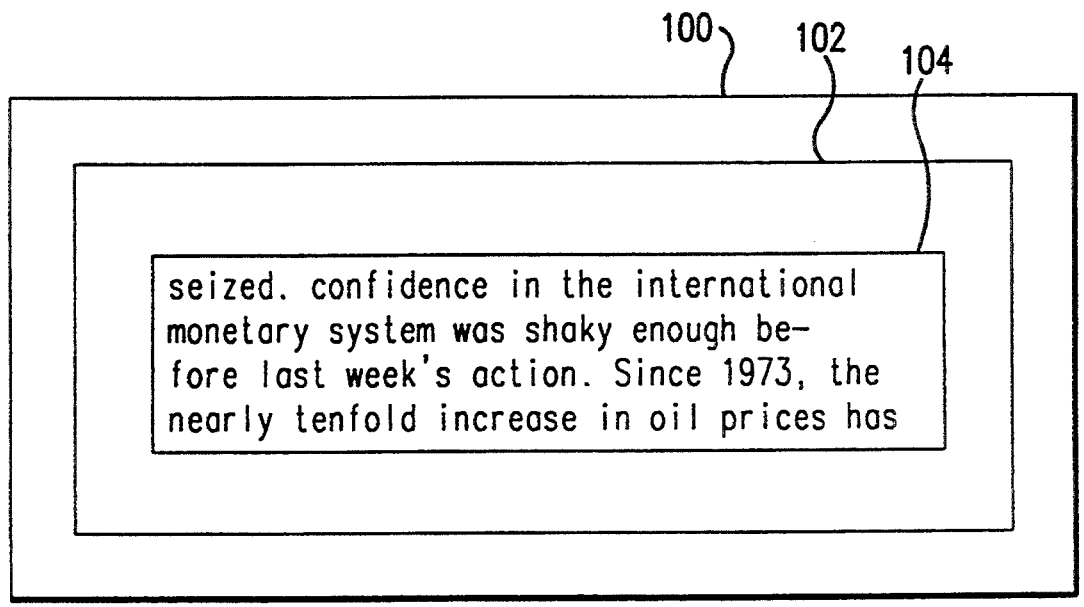
FIG. 2 shows an original document.

In operation, the document 100 containing the image 102, as shown in FIG. 2, is placed on or into and scanned by the scanner 110 to generate a serial or parallel digital data signal. The digital data signal comprises a plurality of signal portions, each portion representative of a corresponding pixel of the original image 102. Each pixel of the image 102 has a location in the image 102 and an image density. Accordingly, each signal portion of the digital data signal includes data representative of the location and image density of the corresponding pixel.

The digital data signal output by the scanner 110 is then stored in the memory 112. The memory 112 may comprise a RAM, a flash memory, a disk memory or the like. Regardless of the type of memory 112, the digital data signal is stored in the memory 112 in response to the location and image density data within each signal portion. Of course, it is understood that the digital data signal can be directly input to the general purpose digital computer 114, rather than into the intermediate memory 112. Alternately, the memory 112 can be incorporated into the general purpose digital computer 114. In any case, it is understood that the memory 112 is used to provide long-term storage of the scanned image 102.

Once the operator has completed inputting documents into the scanner 110 or the system otherwise determines that the digital data signal representative of the image 102 should be converted to character shape coded symbols, the digital data signal representative of the image 102 is output from the memory 112 to the general purpose computer 114. It is, of course, understood that a special purpose digital computer or hard-wired logic circuit can be used in place of the general purpose digital computer 114.

The digital image data signal stored in the memory 112 is output to the general purpose computer 114, where it is input through the input/output means 24 to an image memory 26. Once the digital data signal has been completely stored in the image memory 26, the digital data signal is then made available to the connected component generating means 28. The connected component generating means 28 divides the digital data signal representative of the image 102 into a plurality of connected components, each connected component comprising one or more signal portions of a single line. Each connected component comprises signal portions corresponding to those pixels of the original image 102 which have a certain minimum image density and form a continuous path. Each script character generally corresponds to one connected component, as in the "F" of "Fuji" or more than one connected component, as in the "j" or "i" in "Fuji".

Once the connected component generating means 28 generates the plurality of connected components of the image 102 from the digital data signal, the digital data signal corresponding to the image 102 and the list of connected components generated by the connected component generating means 28 and their locations are stored to the image memory 26 and output to the spatial feature determining means 30.

The spatial feature determining means 30 determines the spatial features of the text portion, such as line positions, word spacing, and character cells. Each character cell includes the vertically aligned connected components within a line between adjacent spaces. For example, the characters "i" and "j" of "Fuji" are each formed from two independent connected components. The spatial feature determining means 30 groups all vertically aligned connected components of one line into one character cell. One preferred method and apparatus for generating the connected components and for determining the spatial features of the text portion 104 from the connected components is described in U.S. application Ser. No. 07/047,514 to Spitz, assigned to the same assignee as the present application and incorporated herein by reference.

The list of connected components and character cells is then output by the spatial feature determining means 30 to the character shape code classifying means 32. The character shape code classifying means 32 converts the connected component or components within a character cell into one of a plurality of abstract character codes based on the number and locations of The connected components within a character cell. The preferred list of character codes, and the characters corresponding to each code, is shown in FIG. 3. As shown in FIG. 3, 13 different abstract character shape codes are used. However, in the first and second preferred embodiments, these 13 character shape codes are limited to the codes: "A, U, i, x, g, j". In addition, two additional codes are used, the "space" code, indicating a space between words, and the "CR" code, indicating the end of a line (the carriage return). Each abstract character shape code represents one or more characters, based on the number of independent connected components in the character cell, the relative locations between the independent connected components of each character cell, and the location of the connected components within the character cell.

Figure 4:
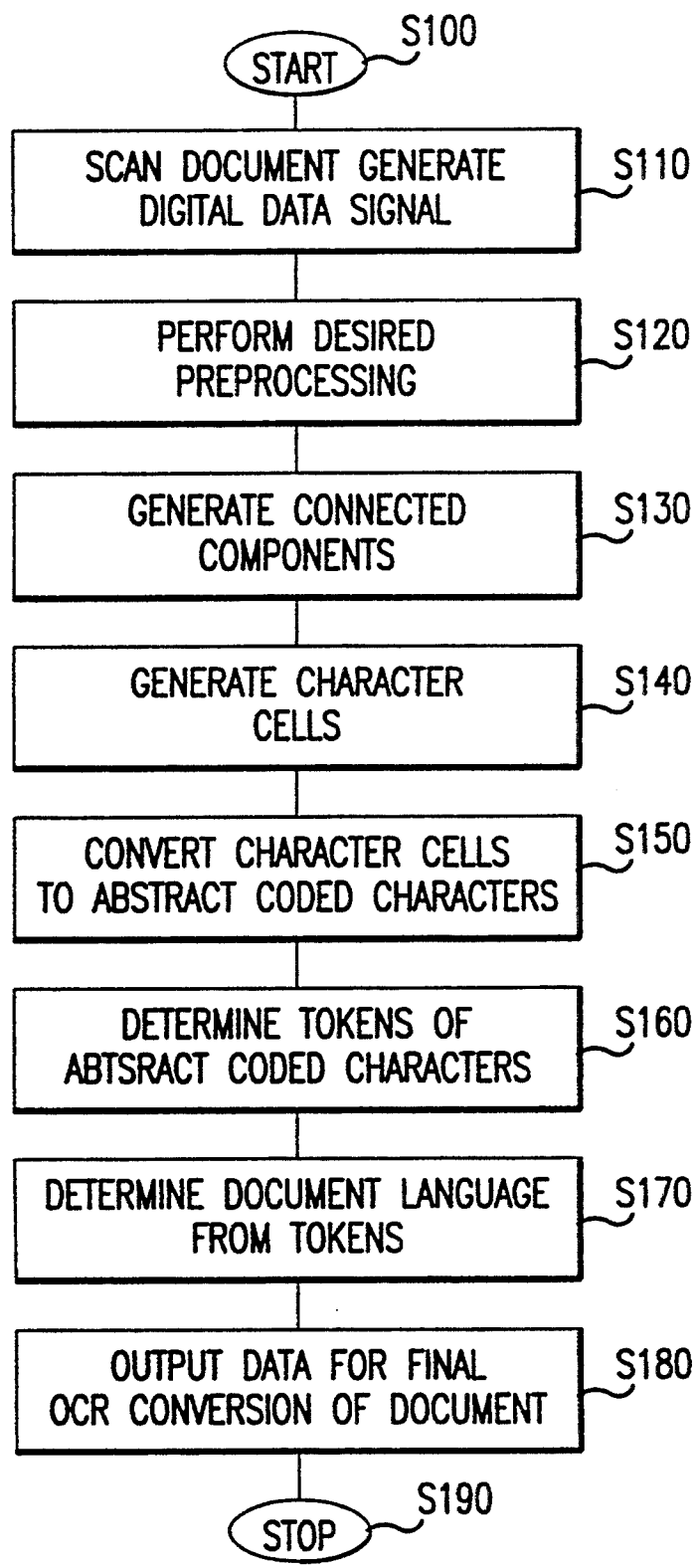
FIG. 4 shows a flow chart of the preferred embodiment of the character shape code classification method of this invention.

A simplified flowchart of the operation of the tokenizing system set forth above is shown in FIG. 4. In step S 100, the system starts, and the document is scanned in step S110 to generate the digital data signal. The digital image data signal is then cleaned-up by applying any desired preprocessing algorithms to the digital image data signal in step S 120. In step S130, the connected components of the digital image data signal are identified and in step S140, the character cells are determined. In step S 150, the character-type classification of each character cell is determined. In step S160, the character codes are grouped together to form tokens based on the interword and intraword spacing.

Figure 5:
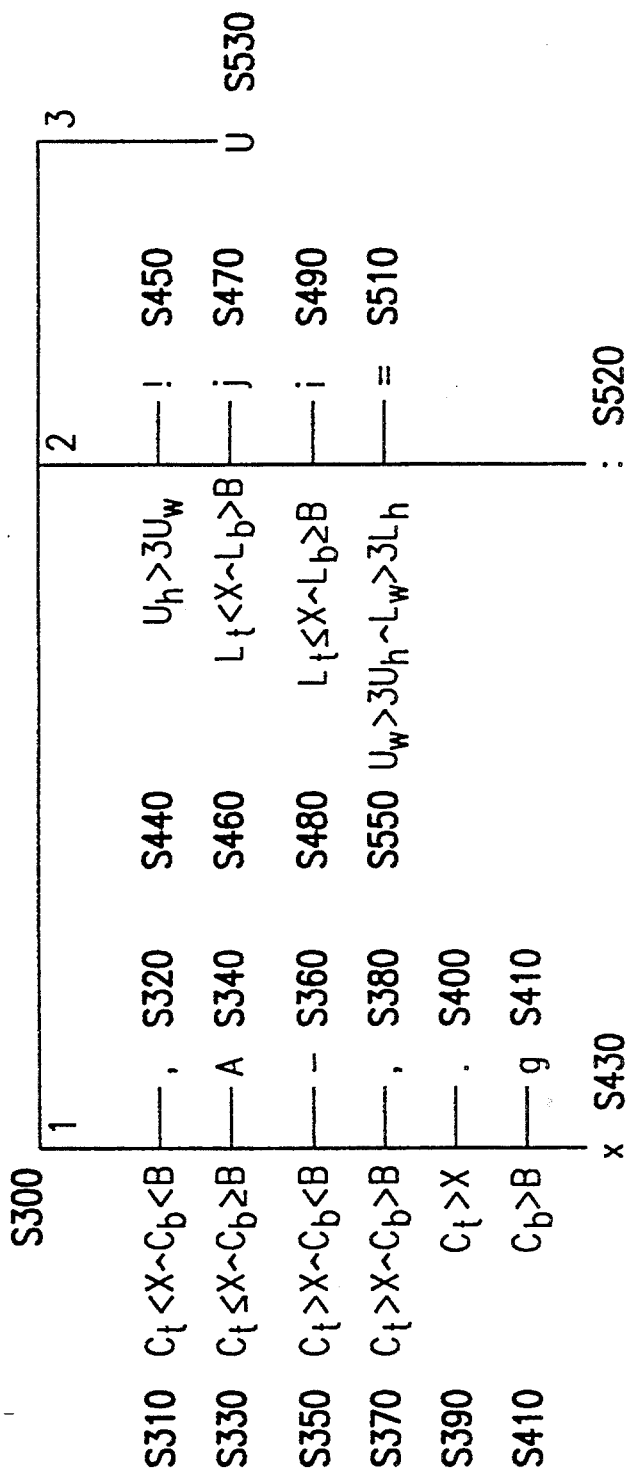
FIG. 5 shows a character shape code classification decision tree.

The decision tree implementing the coding shown in FIG. 3 is shown in FIG. 5. As shown in FIG. 5, there are 7 abstract character codes for character cells having a single connected component, 5 abstract character codes for character cells having two connected components, and one abstract character code for character cells having three connected components.

The preferred embodiment of the method of this invention implements the decision tree shown in FIG. 5. In step S300, the classifying means 32 first determines the number of connected components within the current character cell. In the preferred embodiment of this invention, the character shape code classifying means 32 operates on each character cell of the text portion 104 on a cell-by-cell basis.

Because the method and apparatus of the present invention analyze gross features that are statistically robust, the method and apparatus can operate on even a very poorly printed and/or scanned document, in contrast known OCR techniques analyze fine features, which are easily distorted. Thus, it is not necessary for the digital data signal or the connected components generated from the digital data signal to perfectly represent every character of the document. Rather, this invention is able to withstand common scanning errors, such as splitting a single connected component character into two or more connected components, merging two or more separate connected components into a single connected component or misplacing the connected components on the line. The method and apparatus of this invention are also robust when analyzing images which are skewed and/or warped.

If the classifying means 32 determines, in step S300, that the character cell has only one connected component, the classifying means 32 next determines, in step S310, whether the top position of the connected component is above the x-line position of the current line, while the bottom position is above the baseline. It is understood that the line positions and the connected component locations are measured from a reference position at or near the uppermost position and at or near the leftmost position, such that the positions are positive down and positive right.

If step S310 is positive, then the classifying means 32 converts the character cell in step S320 to an apostrophe. However, if step S310 is negative, the classifying means 32 continues on to step S330. In step S330, the classifying means 32 determines if the top position of the connected component is above the x-line position, while the bottom of the connected component is at or below the baseline position. If step S330 is positive, then the classifying means 32 converts the character cell in step S340 to an "A". The "A" represents all capital letters, all numbers, the lowercase letters having ascenders, and all of the generally vertically oriented punctuation marks, as shown in FIG. 3.

If step S330 is negative, the classifying means 32 continues to step S350. In step S350, the classifying means 32 determines if the top of the connected component is below the x-line position, while the bottom of the connected component is above the baseline position. If step S350 is positive, then the classifying means 32 converts the character cell to a hyphen in step S360.

If step S350 is negative, the classifying means 32 continues to step S370. In step S370, the classifying means 32 determines if the top position of the connected component is below the x-line position, and the bottom position of the connected component is below the baseline position. If step S370 is positive, the classifying means 32 converts the character cell to a comma in step S380. If step S370 is negative, the classifying means 32 continues to step S390. In step S390, the classifying means 32 determines if the top position of the connected component is below the x-line position. If step S390 is positive, the classifying means 32 converts the character cell to a period in step S400.

If step S390 is negative, the classifying means 32 continues to step S410. In step S410, the classifying means 32 determines if the bottom position of the connected component is below the baseline position. If step S410 is positive, the classifying means 32 converts the character cell to a "g" in step S420. The "g" code represents any lower case letter having a descender, as shown in FIG. 3.

If step S410 is negative, the classifying means 32 continues to step S430. In step S430, the classifying means 32 assumes the connected component is a lower case letter which does not have either an ascender or descender, and converts the connected component to an "x". Then, following step S430, or steps S320, S340, S360, S380, S400 and S420, the classifying means 32 selects the next character cell is selected as the current character cell and then returns to step S300.

However, if in step S300 the classifying means 32 determines that there are two connected components in the current character cell, the classifying means 32 continues to step S440. In step S440, the classifying means 32 determines if the height of the upper connected component is greater than 3 times the width of the upper connected component. The height of a connected component is simply the difference between its top position and its bottom position, while the width of a connected component is the difference between its rightmost position and its leftmost position. If step S440 is positive, the classifying means 32 continues to step S450. In step S450, the classifying means 32 converts the character cell to an exclamation point.

If step S440 is negative, the classifying means 32 continues to step S460. In step S460, the classifying means 32 determines if the top position of the upper connected component is above the x-line position, and the bottom position of the lower connected component is below the baseline position. If step S460 is positive, the classifying means 32 converts the character cell to an "j" in step S470. The "j" represents any lower case letter having a separate connected component extending above the x-line, and a separate connected component extending below the baseline.

If step S460 is negative, the classifying means 32 continues to step S480. In step S480, the classifying means 32 determines if the top portion of the upper connected component is above the x-line position and the bottom portion is not below the baseline position. If step S480 is positive, the classifying means 32 converts the character cell to an "i" in step S490. The "i" represents any lower case letter having a separate connected component which extends above the x-line position and a separate connected component which does not extend below the baseline position, as shown in FIG. 3.

If step S480 is negative, the classifying means 32 continues to step S500. In step S500, the classifying means 32 determines if both the upper and lower connected components are three times as wide as they are high. If step S500 is positive, the classifying means 32 converts the character cell to a "=" in step S510. If step S500 is negative, the classifying means 32 assumes the character cell is to be converted to an ":", and in step S520, the character cell is so converted. After step S520, and steps S450, S470, S490 and S510, the classifying means 32 selects the next character cells as the current character cell, and continues to step S300.

However, if the classifying means 32 determines, in step S300, that there are three connected components in the current character cell, the classifiying means 32 continues to step S530. In step S530, the classifying means 32 assumes that the character cell represents an upper or lower case letter which has an umlaut, and therefore converts the character cell to a "U", as shown in FIG. 5. The classifying means 32 then selects a next character cell as the current character cell and continues to step S300. However, if there isn't a next character cell, the classifying means 32 stops classifying the text portion 104, and outputs the list of abstract character codes in place of the character cells to the image memory 26. The text image of FIG. 2 is thus converted to the character shape code representation shown in FIG. 6.

The list of word tokens of one or more coded characters is provided to the compacting means 34, which inputs the list of word tokens representing the text portion 104 then deletes all of the tokens from the text image, except "A,U, g, i, X" and generates the compacted tokenized form of the text portion 104. Of course, it should be understood that in the case of electronic text documents which are already represented in a character coding scheme such as ASCII, a character code converter 36 of the controller 114 can usually convert the ASCII coding directly to the character shape coding.

Figure 7:
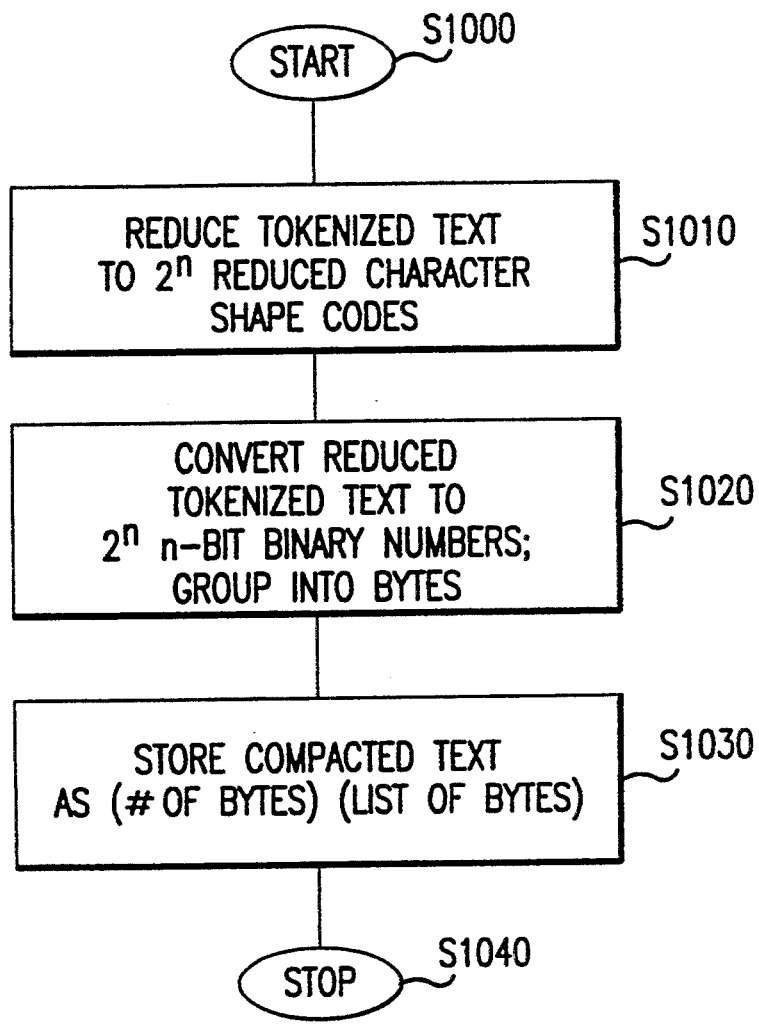
FIG. 7 shows a flowchart of the first preferred embodiment of the compacting method.

Once the tokenized text images and the tokenized electronic text documents are created, the tokenized images and documents are converted by the compacting means 34 into the compacted tokenized images or documents using the first preferred embodiment of the compacting method, as shown in FIG. 7. In the first preferred embodiment, in step S1000, the conversion process starts. In step S1010, the tokenized text documents are reduced from the full set of character shape codes to a reduced set of character shape codes. These reduced character shape codes, A, U, g, i, j, x, [space], and [CR], represent the codes used in the vast majority of word tokens used in actual documents. By limiting the possible character shape codes to these eight reduced character shape codes, the character shape codes can be converted into eight different 3-bit binary numbers. That is, for example, the character shape code "A" is converted to the binary number "000", the "U" is converted to "001" and the character shape code "g" is converted to "010". The other character shape codes of the limited set are likewise converted to unique 3-bit binary numbers. Once the tokenized text document is converted, in step S1010, from the limited set of character shape codes to the string of binary digits, the strings of bits are grouped into 8-bit bytes in step S1020, with the 3-bit binary codes wrapping across byte boundaries as necessary. That is, 2⅔ shape codes will be squeezed into each 8-bit byte. Then, in step S1030, this compressed "compacted tokenized" code is stored in the form of: [number of bytes in compacted code][bytes of compacted code]. The process then stops in step S1040.

Figure 8:
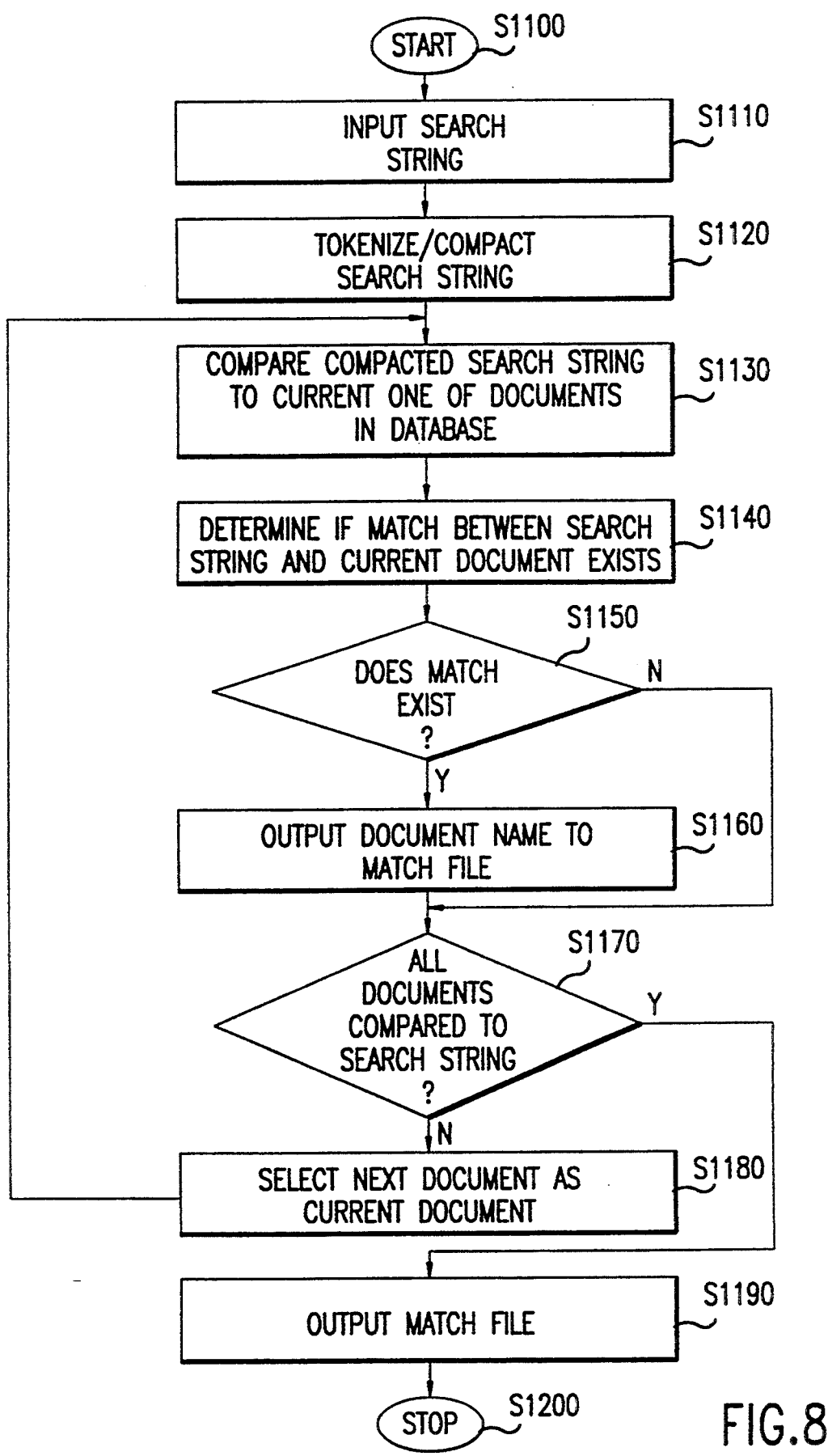
FIG. 8 shows a flowchart of a first preferred embodiment of the method for searching and matching a text file.

FIG. 8 shows the first preferred embodiment of the method for searching a compacted tokenized text file using a search string. Starting from step S1100, in step S1110 a search string is input. In step S1120, the search string is first tokenized and then compacted using the methods set forth in steps S310–S530 and in steps S1000–S1040. Next, in step S1130, the compacted tokenized search string is compared against a first compacted tokenized document in the compacted tokenized database to locate exact matches between the search string and a portion of the document being searched. In step S1140, the system determines if an exact match exists between the compacted tokenized search string and the compacted tokenized text documents. In step S1150, if an exact match was located in step S1140, control continues to step S1160, which outputs the name of the compacted tokenized text document having the exact match to a match file. Then control continues to step S1170. On the other hand, if, in step S1150, no exact match was found in step S1140, control continues directly to step S1170.

In step S1170, the system determines if every entry in the database has been analyzed. If not, control continues to step S1180, where a next document is selected. Then, control returns back to step S1130. If every document in the database has been searched, control continues to step S1190, which outputs the match file, which lists which database files matched the test string. Then control continues to step S1200, where the process stops.

Thus, in the first preferred embodiment (which finds exact matches), a test string, is either directly input or taken from a text image. The test string is tokenized and compacted. The test string is then compared to each entry of a database of compacted tokenized text images or compacted tokenized electronic test documents, respectively, using the comparator 36 of the controller 114 to locate exact matches. Each text document having an exact match is output to identify each document of the database which has the text string.

In operation, compacted tokenized test string is compared to the compacted, tokenized document or image in a left-to-right, bit-by-bit basis moving from a beginning portion of the string of bits to an end portion of the string of bits of each document.

In a first variation of the first preferred embodiment, rather than inputting and comparing a test string in steps S1110–S1140, an entire search document is used. Thus, the entire document is tokenized and compacted in preparation for comparing the search document to each one of the plurality of documents in the database.

In a second variation of the first preferred embodiment, the classifying means 32, after initially converting a connected component to the "x" character shape coded symbol in step S430, determines if a central portion of the right hand side of the connected component, has an opening between the baseline and x-line positions. If such an opening exists, the character classifying means 34 converts the "x" character shape code to an "e" character shaped code. The "e" character shape code represents the letters "e" and "c". In this second variation of the first preferred embodiment, when the tokenized images or documents are reduced in step S1010, the limited set of codes includes the "e" character shaped code, rather than the [CR] character shape code. However, it should be understood that, in this second variation of the first preferred embodiment, the matching operation can use either of the first or second preferred embodiments for performing the comparing step.

In the second preferred embodiment, an electronic search string is used to search a database of tokenized text images.

In a third preferred embodiment, the compacting means 34 rather than converting the tokenized document into a reduced tokenized document then compacting the document, as in steps S1000S–1040, instead uses the reduced tokenized document to generate a set of at least one floating point numbers. As shown in Table 1, at least 5 possible floating point numbers, identified as values 1–5, can be generated.

TABLE 1

| val | definition |
|---|---|
| 1 | summation of results of XOR-ing all pairs of consecutive shape code mapped primes |
| 2 | "average shape code" (sum of shape code prime values for each character cell divided by the number of shape codes) |
| 3 | sum of occurrences of each shape code when multiplied by the mapped prime number |
| 4 | same as val1 except that, instead of XOR-ing pairs of consecutive codes, every other code is XOR-ed |
| 5 | same as val1 except that it doesn't cross word boundaries. That is, given "of the", it would XOR: map[o] map[0], map[f] map[o] map[t] − map[o], |

TABLE 1-continued

| val | definition |
|---|---|
| | map[h]' map[t], map[e]' map[h] |

As shown in Table 1, the first value is generated by converting each character shape coded symbol to one of a set of numbers. The numbers forming the set of numbers are all relatively prime to each other. Then, each pair of consecutive shape codes are XORed. The results of each XOR operation are then summed to generate the first value.

The second value is generated by summing the numbers representing the characters of the tokenized file and dividing the sum by the total number of tokenized characters in the text string or document. The third value is formed by multiplying the number of times each character shape code appears in the text string or document by its representative number, then summing the results of the multiplication for each character code.

The fourth value is generated like the first value, except every other code is XORed together, rather than every adjacent pair. Finally, the fifth value is generated like the first value. In the fifth value, however, the XOR process does not extend across word boundaries (although it does include the leading space of each word token).

Figure 9:
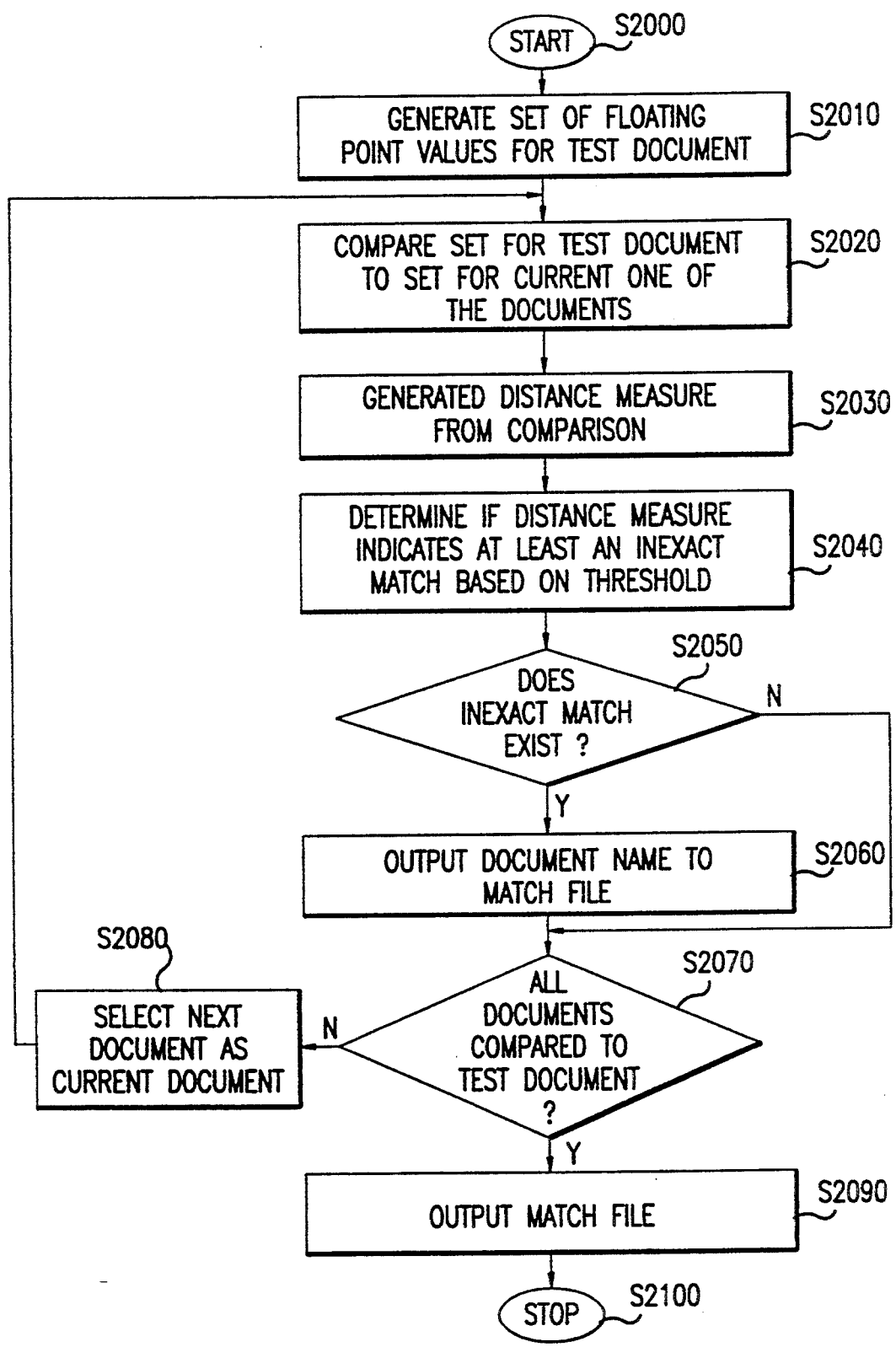
FIG. 9 shows a flowchart of the third preferred embodiment of the method for searching and matching a text file.

By generating at least one of these values for each text image or document in the database and the corresponding value for the search string or document, inexact matches between the text string or document and the image or text documents forming the database can be located. That is, after stating in step S2000, as shown in FIG. 9, the set of at least one floating point numbers for the test document is generated in step S2010. Then, in step S2020, the values of each one of the set of floating point number of a test document is compared to the corresponding floating point number of each one of the sets of floating point numbers for a current one of the text images or text documents in the document database. Then, in step S2030, a distance measure is generated for the current one of the entries of the document database, representing the total difference or similarity between the set of floating point values of the test document and the set of floating point values of the current entry of the document database.

This distance value is then analyzed in step S2040 to determine if it indicates at least an inexact match between the test document and the current entry. If at least an inexact match is found in step S2050, the name of the matching document is output to match file in step 52060. If no match is found, control continues to step S2070 directly from step S2050. Then, in step S2070, the database is checked to determine if every entry has been compared to the test document. If not, control continues to step S2080, where a next entry is selected, then returned to step S2030. If so, the list of at least inexactly matching entries is output in step S2090. Then, in step S2100, the system stops. To ensure the identified at least inexact matches between the search string or database and the text image or text document are valid, a threshold is used. In addition, depending on how closely the operator wants the text image or text document to match the search document, the threshold can be adjusted accordingly.

Using the first preferred embodiment described above, a multilingual document database having documents in English, French and German was searched using 167 different test strings which would be of interest to speakers of these languages. Using the UNIX "AGREP" command, which provides for an approximate string match search, compacted tokenized forms of the strings were compared to compacted tokenized forms of the documents in the database. For 68% of the 167 search strings (114 search strings) no false positives or false negatives were returned. That is, every document containing the search string was located, and no document which was located did not contain the search string. For the other 32% (54 search strings) the error rate increased. However, these 54 search strings tended to be the shorter, less distinctive strings.

In a test of the second preferred embodiment, 46 English, French and German language documents were tokenized and compacted to form the database. Then, 36 scannings of these documents were compared to the original documents by tokenizing the scanned documents and uncompacting the documents in the database. Then the reduced tokenized forms of the scanned documents were compared to the reduced tokenized forms of the original documents. No particular care was taken when generating the 36 scanned documents. Thus, these documents had skew angles up to 1.8°. In this test, all 36 documents were correctly matched to their originals. In a further test, multiple generations of photocopies were scanned and compared to the database documents. This second preferred embodiment was robust up to the third and fourth generation photocopies. In addition, the second preferred embodiment was occasionally able to correctly even seventh generation photocopies.

These previous tests were done at a scanning resolution at 300 dpi. A further test was performed by scanning the text images at 200 dpi. In this lower resolution test, 34 of the 36 documents were correctly matched to their original documents in the database. While two of the documents could not be matched to any of the documents in the database, no false positives were generated.

A final test used the full five-dimensional set of floating point values to compare these 36 scanned documents with the database documents. The third preferred embodiment was tested to find the closest match and a threshold of 95% matching was used. Using this third preferred embodiment, the corresponding original document for 34 of the 36 scanned text images was identified as the closest match. In the other two cases, the corresponding original document was the second closest match.

While the present invention has been described with reference to specific embodiment, it is not confined to the specific details set forth, but is intended to cover such modifications or changes that may come within the scope of the following claims.

What is claimed is:

1. A method for matching a test string to a plurality of documents the steps of:
   converting each of the plurality of documents to a character shape code representation by mapping each character of said documents to one of a plurality of character shape codes, wherein each code of said plurality of said character shape codes represents a partial collection of all characters of said documents, wherein each character of said partial collection shares spatial features related to the x-line and baseline of all characters of said documents;
   converting the character shape code representation to a reduced binary data string for each of the plurality of documents, wherein the reduced binary data string is less than a binary data string corresponding to the characters of the documents;
   storing the reduced binary data string for each of the plurality of documents to a database;
   inputting a test string;
   converting the test string to the character shape code representation;
   converting the character shape code representation of the test string to the reduced binary data string;
   matching the reduced binary data string of the test string to the reduced binary data string of each of the plurality of documents; and
   outputting a list of matching documents.

2. The document matching method of claim 1, wherein the test string is one of a text string and a text document.

3. The document matching method of claim 1, wherein the character shape code converting steps each comprise converting the plurality of documents and the test string using a reduced set of said character shape codes, wherein said reduced set of character shape codes is a subset of said plurality of said character shape codes.

4. The document matching method of claim 3, wherein the reduced character shape code comprises at most $2^n$ character shape codes and wherein the reduced binary data string converting steps each comprise converting each reduced character shape codes to a different n-bit binary number, wherein n is a positive integer.

5. The document matching method of claim 4, wherein the n-bit binary numbers are grouped into 8-bit bytes, wherein n is a positive integer.

6. The document matching method of claim 1, wherein the matching step comprises the steps of:
   (a) comparing the binary data string representation of the test string to the first bits of the binary data string representation of a current one of the plurality of documents,
   (b) determining if the test string at least inexactly matches the current document;
   (c) outputting a match signal when the test string at least inexactly matches the current document;
   (d) shifting the test string right one bit in the current document;
   (e) repeating steps a-d until one of the test string is compared to the last bits of the current document and an at least inexact match is found occurs; and
   (f) repeating steps a-e for each one of the plurality of documents.

* * * * *